(12) United States Patent
Hall et al.

(10) Patent No.: US 7,239,320 B1
(45) Date of Patent: Jul. 3, 2007

(54) SYSTEM AND METHOD FOR TRANSMITTING INTERACTIVE SYNCHRONIZED GRAPHICS

(75) Inventors: Thomas B. Hall, Madison, WI (US); Walter Burt, Madison, WI (US)

(73) Assignee: MusicNotes, Inc., Madison, WI (US)

( * ) Notice: Subject to any disclaimer, the term of this patent is extended or adjusted under 35 U.S.C. 154(b) by 1411 days.

(21) Appl. No.: 09/607,162

(22) Filed: Jun. 29, 2000

Related U.S. Application Data

(60) Provisional application No. 60/141,679, filed on Jun. 30, 1999.

(51) Int. Cl.
*G06T 13/00* (2006.01)
*G06T 15/70* (2006.01)
*G11B 27/00* (2006.01)

(52) U.S. Cl. ............................ 345/473; 715/723
(58) Field of Classification Search .............. 345/473, 345/723, 475; 715/700, 723
See application file for complete search history.

(56) References Cited

U.S. PATENT DOCUMENTS

| | | | | |
|---|---|---|---|---|
| 5,533,903 A | * | 7/1996 | Kennedy | 345/473 X |
| 5,621,538 A | | 4/1997 | Gnant et al. | 386/65 |
| 5,636,276 A | | 6/1997 | Brugger | 380/217 |
| 5,690,496 A | | 11/1997 | Kennedy | 434/307 |
| 5,746,605 A | * | 5/1998 | Kennedy | 345/473 X |
| 5,841,438 A | | 11/1998 | Cave | 345/723 |
| 5,889,514 A | * | 3/1999 | Boezeman et al. | 345/723 X |
| 5,889,860 A | | 3/1999 | Eller et al. | 705/51 |

OTHER PUBLICATIONS

Barrett, D, "Net Smarts," Keyboard, vol. 24, No. 12, p. 122-123,125, (Dec. 1989).
Yoneda, T. et al., "A New Communication Tool: Time Dependant Multimedia Document," Proceedings of the International Conference on Disturbed Computing Systems, vol. conf. 12 , p. 90-7, (Jun. 9, 1992).
Yoneda, T. et al., "Constructing a System Using Time Dependant Multimedia Document," Proceedings of the Annual International Phoenix Conference on Computers and Communication, vol. conf. 11 , p. 140-7, (Apr. 1, 1992).

* cited by examiner

*Primary Examiner*—Kee M. Tung
*Assistant Examiner*—Chante Harrison
(74) *Attorney, Agent, or Firm*—Houston Eliseeva LLP

(57) ABSTRACT

A method and system for compact representation of interactive data and transmitting the data via a computer network is disclosed. The system and method provide for logically separating the data into a graphical and multimedia data sections. The multimedia data section is further divided into at least three sequencing schemes in order to facilitate data transfer between a server and a user. The three sequencing schemes include a hierarchical structure of bounding boxes facilitating data compression and interaction between the user and the displayed interactive content, a sequencing map comprising one or more tracks for mapping paths through the bounding boxes, and a time map for synchronizing the sequence map with an audio or video recording. Providing interactive printable sheet music is described as one of the embodiments of the system and method of the present invention.

5 Claims, 5 Drawing Sheets

Fig. 3

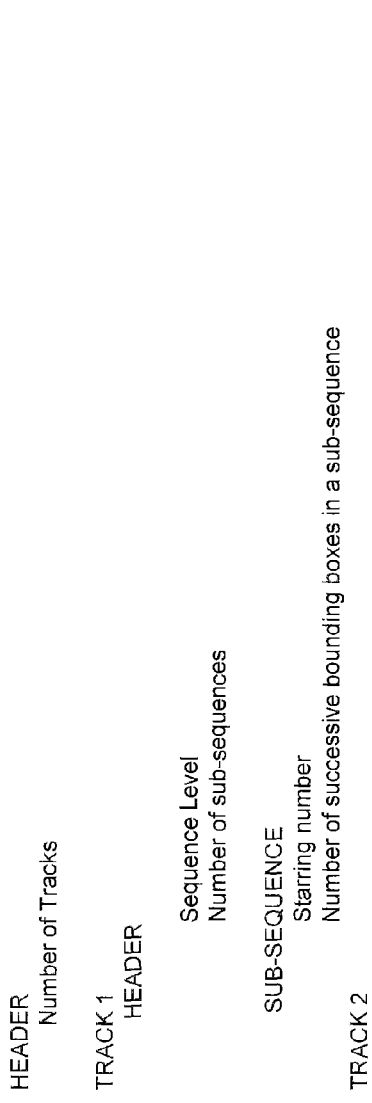

FIGURE 4: Scheme for a Sequence Map

```
SEQUENCE MAP
    HEADER
        Number of Tracks
    TRACK 1
        HEADER
            Sequence Level
            Number of sub-sequences
        SUB-SEQUENCE
            Starring number
            Number of successive bounding boxes in a sub-sequence
    TRACK 2
```

FIGURE 5: Data for a Sequence Map of a 124 Measure String quarret, with a repeat of 1-8 Measures

```
       4    ; 1 byte: number of tracks – header

T      4    ; 1 byte: track 1 uses Level 4 bounding boxes–that is, measures
R      2    ; 1 byte: number of sub sequences
A  ↑   1    ; 1 byte: start at measure one
C      8    ; 1 byte: use 8 measures of bounding boxes
K      1    ; 1 byte: start at measure 1
1     124   ; 1 byte: use 124 measures of bounding boxes T      4    ; 1 byte: track 2 uses Level bounding boxes
R      2    ; 1 byte: number of sub sequence
A  ↑   1    ; 1 byte: start at measure one
C      8    ; 1 byte: use 8 measures of bounding boxes
K      1    ; 1 byte: start at measure 1
      124   ; 1 byte: use 124 measures of bounding boxes 2     Etc…for tracks 3 and 4

Total bytes: 25
```

FIGURE 6: Scheme for a Time Map

HEADER

Audio/Visual source: index in table giving information about the real-time performance, such as the track number on a CD or total duration of a recording.

Number of events in map (slices in a musical score, pictures in a slide show, etc.)

TIME EVENTS

Event 1:   Time offset: time units since previous event
           Track flags: bits for each track in the Sequence Map Event 2:   Time offset: time units since previous event
           Track flags: bits for each track in the Sequence Map Event 3:   ...

FIGURE 7: Sample Data for a Time Map of a Musical Score According to the scheme of Figure 6

1      ; 1 byte: index into table of audio sources
4985   ; variable number of bytes: total slices in score
0      ; variable bytes: offset of slice 1 from start of recording
7      ; variable bytes: tracks 1, 2, 3 have slice bounding boxes
25     ; variable bytes: offset of slice 2 from slice 1, in time units
6      ; variable bytes: tracks 2 & 3 have slice bounding boxes
13     ; variable bytes: offset of slice 3 from slice 2
2      ; variable bytes: only track two has music at this slice
Etc....

[Note: values are compressed by using a single byte for all values under 128, and a bit flag (bit 7) and variable numbers of bytes for all larger values.]

SYSTEM AND METHOD FOR TRANSMITTING INTERACTIVE SYNCHRONIZED GRAPHICS

CROSS CLAIM TO A RELATED APPLICATION

This application claims priority on earlier filed U.S. provisional patent application Ser. No. 60/141,679, filed Jun. 30, 1999, which is incorporated herein by reference.

FIELD OF THE INVENTION

The present invention relates generally to the field of transmitting data over the communication lines. More specifically, the invention relates to the system and method allowing compact representation of interactive printable music and transmission of the compact representation from the server to the client, the compact representation being achieved at the pre-client production step.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark office patent file or Records, but otherwise reserves all copyright rights whatsoever. The following notice applies to the software and data as described below and in the drawings hereto except as otherwise noted therein: Copyright©1999, Musicnotes, Inc., All Rights reserved.

BACKGROUND ART

Compact representation of data transmitted over a network, such as the Internet, to a user provides for a faster transmission of a stream of data between a server and a client. Compact representation reduces the size of the transmitted files, contributing, therefore, to the reduction of time the user needs to wait for the file to be downloaded from the host server to the user's computer. Compact representation and fast transmission of data becomes especially important in the case of large files, since long downloading time often is the key consideration in the user's decision to download a certain file from an Internet site. From the viewpoint of a business operating an Internet site and selling various products to its customers in the electronic form via the Internet site, compressing the data for faster transmission to the customers without sacrificing the quality of the data is one of the most important issues contributing to successful business operation.

Graphical representation of sheet music can be transmitted over the Internet similarly to other non-music graphical materials. If all that is transmitted to the user is a file of a graphical representation of sheet music to be displayed on the user's computer screen, then the transmission time of such a file is similar to that of a standard graphical file. However, the size of a file and the transmission time greatly increase, if the representation of sheet music comprises not only its graphical representation, but also a variety of interactive capabilities available to the user. Such interactive capabilities may include playback features, notation tools, and scrolling the score as the music is played. The problem of achieving a compact representation of interactive printable digital sheet music and preparing the compact file of such music before uploading the file to server and then allowing the user to download the file is not easy to solve. It is also desirable to have the ability to separate various interactive features of an interactive sheet music file to give a user an option to download, for example, only the interactive part corresponding to a particular musical instrument or voice, or highlight only a specific part of the score as the music plays, or download the music only in the MIDI representation.

The need, therefore, exists, to provide the system and method for providing compact representation of printable sheet music with interactive features and the capabilities to choose and receive a preselected number of interactive features, the compact representation allowing the files containing such sheet music to be quickly transmitted from the server to the user.

SUMMARY OF THE INVENTION

The present invention addresses and solves the above-described need by performing logical partition of a file into a number of logical independent data sets. One such logical data set comprises information about the graphical data which are necessary to display sheet music on a computer screen. The graphical set contains all the information about bars, notes and all music notation for displaying and presenting a piece of sheet music. Another logical set of data comprises multimedia information which maps musical notation onto different musical and interactive functions associated with the notation. The two sets of data-graphical and multimedia-are independent from each other and can be further broken down into various subsets of data. Graphical and multimedia sets can be delivered to a user independently, or only one set of data can be delivered, if, for example, the user chooses to download only the graphical representation of the sheet music without the accompanying multimedia data.

An important feature of the present invention is a multimedia data subset comprising a hierarchical structure of bounding boxes. Although the bounding boxes are not explicitly shown on the screen when a piece of sheet music is displayed, they are implicitly present in the representation of the music. These bounding boxes may be used to serve a variety of functions. For instance, they may delineate areas of the graphics that correspond to events in a time stream. Thus, in the case of sheet music, the bounding boxes are used to position the musical graphics on the screen to insure that the relevant portions of the music are visible when the music is playing. During playback, the bounding boxes may also be used to locate and hi-light individual notes and instruments in the music. Other functions, such as hot-linking specific areas of the graphical display to multimedia functions, and setting time passages and instrumental tracks from user mouse input, are conveniently performed through these bounding boxes.

The bounding boxes are laid out on a displayed page of sheet music as a multi-level hierarchical structure and comprise the following hierarchical levels. A level 1 bounding box generally corresponds to the page displayed on the computer screen. A level 2 bounding box generally corresponds to a system of music on the page. A level 3 bounding box generally corresponds to a staff of music within the system box. A level 4 bounding box generally corresponds to a measure of music within the staff box. A level 5 bounding box generally corresponds to a vertical slice of chord music within the measure box. A level 6 bounding box generally corresponds to a note within the slice box. It is noted that level 5 and 6 bounding boxes are optional.

All levels of bounding boxes may be used in performing the described functions. Generally, however, certain levels of bounding boxes are particularly helpful in a specific function. For example, level 1 page boxes are used to display and fit a page on the screen, level 6 boxes are used to highlight subvoices or to generate a MIDI file. The position of the first bounding box on a page is determined by coordinates calculated from the top left corner of the page. The positions of a subsequent bounding box are calculated from the positions of the preceding bounding box.

The minimization of the size of a data file is achieved by separating the set of data pertaining to the bounding boxes and the set of data pertaining to the information that is associated with the bounding boxes. To relate the hierarchical structure of bounding boxes to the interactive feature data contained in the same file, the multimedia data set maps each bounding box with a particular notation of an interactive capability. For example, the multimedia data will direct a half middle C note to be played with a certain bounding box on a page.

Although the multimedia set of data alone without the graphical set may not be very useful to a user, the present invention provides for using the separability of the multimedia and graphical sets of data to allow the user to download the graphical data set first, and then download the multimedia set at a later time. Since each file encoded in accordance with the method of the present invention consists of logically separate and independent sets and subsets of data, the file can be stripped out of the data not needed during a particular download, which data can be delivered to the user later. The separability of various data sets also provides great flexibility in the inclusion, exclusion, and substitution of various multimedia features. For instance, synchronization of sheet music to a different musical performance may be achieved by substituting a new set of timing values in the timing data.

The separation of graphical and multimedia sets of data in a file, especially the separation of the bounding boxes and the information associated with the boxes, also provides various levels of abstraction in displaying, printing, viewing the music and performing the interactive features associated with the music. For example, in a particular musical piece, the user can choose to display on the screen the full score of the music with only a melody and the chords highlighted, while playing a complete performance of the piece of music with all the voices and the orchestra.

Because many notes in a musical piece have the same pitch, duration and other elements in common, the data about the notes are consolidated into several categories, and then individual notes refer to the individual categories. Similarly, because most chords used in a piece are repeated many times, all alike chords are given an ID number and are defined only once. Such techniques contribute to compressing the data file and reduce the time necessary to transmit the file from the server to a user.

Use of the bounding box abstraction in music representation together with the logical separation of the graphical and multimedia sets of data in a file makes it especially convenient and efficient to link the bounding boxes to the time sequence in order to synchronize the performance of the music with the corresponding music notation and features displayed on the screen. The present invention synchronizes performing of a musical piece with displaying and highlighting it on a computer screen by building a time sequence, which maps the time line of the performance onto the corresponding bounding boxes. The data file encoding a musical piece contains in it the sequences for each musical instrument or voice performing the piece. Since time sequences result from mapping the time line of the performance onto the bounding box data set, eliminating, therefore, the necessity to relate the time line to any other information contained in the data file, the size of the file can be kept small and suitable for fast transmissions between the server and the client sites.

It is also contemplated by the present invention that a bounding box is associated with automatic self-contained educational content. To achieve this feature, a bounding box corresponding to a particular note, or musical sign, or a musical term is categorized. If a user clicks on a musical sign, or a term, or a note, a pop-up window with educational content will appear on the computer screen. The help file containing the educational information appearing in the pop-up windows can be downloaded by a user once and then used as needed in different pieces of music.

The MTD (Music Transfer Document) file format supports extensive segmentation of graphical and time-ordered data into discrete units (called "sections" below). These units individually or in varying combinations support and enhance, among others, the following functions:

Efficient outputting of the graphical image to a screen or printer;

Real-time synchronization of the visual display—through re-positioning, zooming and/or hi-lighting—of any portion of the graphical image to time-ordered events, such as those in a pre-existing musical recording or movie;

Definition of sequences of 'snapshots' of any portions of the graphical image;

Easy correlation of any of these "snapshots" with audio or visual data;

Efficient programmatic generation of a time-ordered series of audio or visual data (a "movie" or "performance") according to any of the defined sequences of graphical 'snapshots', such that on playback of the newly generated series, the audio or visual events are synchronized with the original graphical image;

Interaction with and control of time-ordered events through user actions, such as mouse clicks, mouse drawing, and keyboard input;

Linking of discrete elements of the graphical image to multimedia content, and programs, such as Help, video and audio players, and Internet URLs;

High levels of data compression because of the segmentation of data into units that contain only one or a few types of similar data;

Efficient and reliable electronic transmission, such as through the Internet or FTP;

Efficient exclusion of data unneeded for a particular application;

Speedy and enhanced presentation of graphical data, such as display of complete graphical objects before transmission of the entire file, to users through standard browsers.

The discrete segments of data that comprise a Music Transfer Document (MTD) are known as "sections". An MTD file conforms to the publicly available format standard known as RIFF by storing the data for each section in a RIFF "chunk" or sub-chunk.

These and other aspects of the present invention will become more readily apparent to those of ordinary skill in the art in reference to the detailed description taken together with the accompanying drawing figures.

BRIEF DESCRIPTION OF THE DRAWING FIGURES

FIG. 3 is a graphical representation of sheet music with a hierarchical structure of bounding boxes.

FIG. 4 is a schema for a Sequence Map.

FIG. 5 represents sample data for a Sequence Map.

FIG. 6 is a schema for a Time Map.

FIG. 7 represents sample data for a Time Map.

FIG. 8 is a schematic representation of a method of providing a compact data file.

DETAILED DESCRIPTION OF THE PREFERRED EMBODIMENT

In the following detailed description of the invention, references are made to the accompanying drawings, which for a part thereof, and in which specific preferred embodiments for practicing the invention are shown by way of illustration. These embodiments are described in sufficient detail to enable those skilled in the art to practice the invention, and it is to be understood that other embodiments may be utilized and that logical or other changes may be made without departing from the spirit and scope of the present invention. The following detailed description is, therefore, not to be taken in a limiting sense, and the scope of the present invention is to be defined only by the appended claims.

Figure 1:
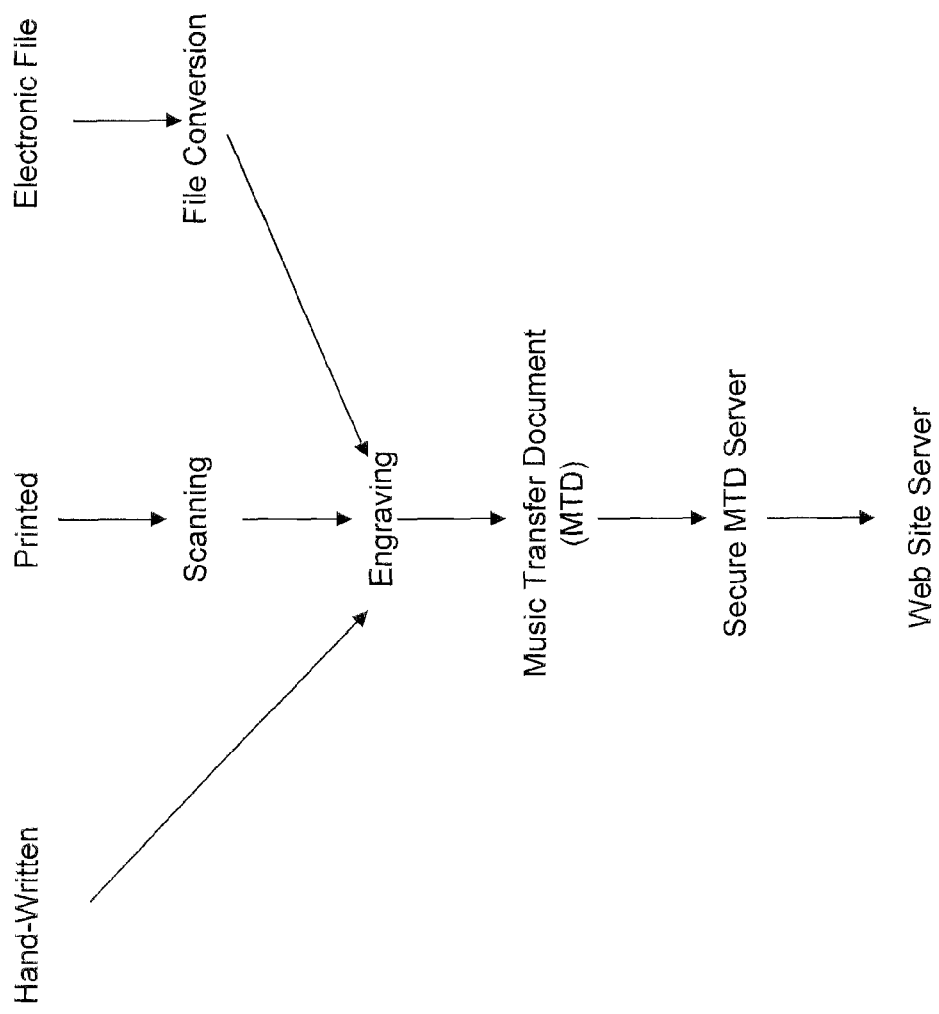
FIG. 1 is a block diagram illustrating the steps of production of an .MTD file and delivery of the file to a server.
Figure 2:
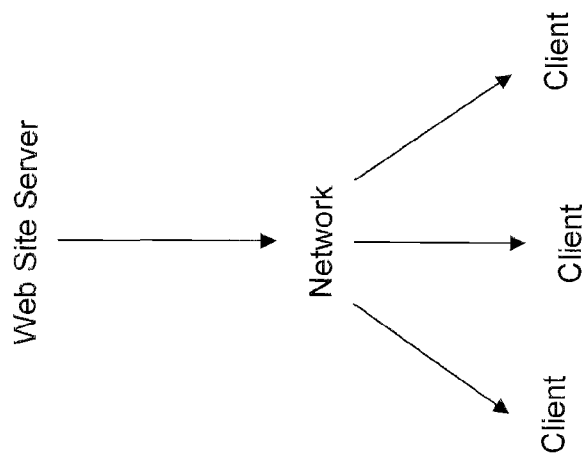
FIG. 2 is block diagram illustrating the server-client transmission via a computer network.

According to the method of the present invention, illustrated in FIG. 1, the first step in delivering digital interactive sheet music to a user over the communication lines consists of converting hand written, printed or already electronic music into an MTD format at the production step. Once a piece of music has been converted from its original form into the MTD format, the music is placed on a server, such as a secure Internet server, where it can be found, viewed and downloaded by a user subscriber through the Internet web site hosted on the server. The user is able to view/display the music on a computer screen by using a viewer available for downloading from the web site, as well as play the displayed music with a player also available for downloading from the web site. The file transfer process between the server and the client via computer network is shown in FIG. 2.

As mentioned above, before any file with interactive digital sheet music is transmitted from the server to the client, the file is encoded in the MTD format at the production step. All the MTD files have a notational representation section (graphical section) and an optional hyper media section (multimedia section) that provides additional information pertaining to the interactive multimedia capabilities. The hyper media section is rigidly logically separated from the notational representation of the music, so that the notation can be changed to some entirely different representation, such as, for example, JPEG, without invalidating or having to change the hyper media section.

Each MTD file starts with two four-letter signatures and the size of the file. All the data in the file come in "Sections," which may grow from one version to another by adding data beyond the fields currently declared for that particular Section. The file format itself may also grow by adding new types of Sections. The sections which define the functionality and provide the advantages of the MTD files are described in detail below.

The graphical data sections comprise information about page layout, a list of fonts, all bibliographical data associated with the file (such as the author's name, the composer's name, copyright information, price category and the like). A separate section contains information which allows or disallows specific uses of the file, such as printing, saving a generated music rendition, copying graphics to the clipboard, etc.

For each page of graphics, data is given that when fed to a device driver that recognizes such data, the page will be properly rendered. The data for any graphical object on the page generally consists of numeric values and the number of graphic rendering procedure in the device driver that is to be called.

The MTD data is carefully ordered to reduce repetitive actions. For instance, all data to display lines at a specific weight are grouped together; thus, the procedure that establishes the line weight is called only once, and then all the lines are drawn.

Because the graphics data is isolated in its own section, it may be easily separated out and transmitted efficiently to applications that require graphics data only. The MTD data in the graphical section is further segmented into separate pages so that less than all of the pages may be sent to an application, a particularly useful feature on the Internet where display of pages can be slow or when display of only a sample page(s) may be desired.

The Multimedia Data section comprises a number of data subsets allowing compression of a musical piece into a small MTD file having a variety of interactive features. By a three-part abstraction of information, MTD files achieve a high degree of data compression and functional flexibility that provide a distinct advantage in server/client applications. The abstractions are the following:

1. Hierarchical bounding boxes, which are used to locate and classify information on the graphical image.

2. Different paths or "threads" through the graphical image, which are defined by specifying sequences of bounding boxes (Sequence Maps).

3. Time Maps used to assign time values to successive bounding boxes in a path. This time sequencing allows the bounding boxes to be synchronized with external events, such as articulations in a musical recording or spoken words in an audio recording.

The process of abstracting the above-described information is done server-side. Non-interesting or irrelevant data are excluded, and by separating the relevant data into the above abstractions, compression techniques take advantage of data repetition and sequencing. On the client-side, processing of the transmitted information is minimized—the relevant information is already abstracted and ordered.

The segmentation of the necessary information into these three abstractions has distinct advantages in adapting the MTD files for a variety of uses. For instance, multiple time maps, derived from different performances of the same musical score, can be defined and used with the same bounding boxes and the same "threads" of bounding boxes.

The three levels of abstraction mentioned above will now be described.

1. Hierarchical Bounding Boxes.

Bounding box data delineate areas on the displayed sheet of music that correspond to events in the musical time stream. The bonding boxes themselves are defined for areas of interest within each of the graphical pages. These bounding boxes are used to control the focus and animation of the displayed graphics when those graphics are synchronized to some series of time-ordered events, such as, for example, a musical recording. However, in general the approach of using bounding boxes can be used to synchronize any kind of displayed graphics with a series of time ordered events. In the case of the audio music which unfolds in time, the bounding boxes define what area of the graphics must be visible at any particular moment. If the displaying program further chooses to change the color of the graphics within a bounding box, corresponding to a particular moment in time, and to turn the color "off" when some new time event occurs, the graphics will appear to be animated in time to the music. It should be noted that the bounding box sequencing scheme can be applied not only to the musical notation and musical recordings described in detail herein, but also to any kind of graphics synchronized with a series of time ordered events.

Because the size of the viewer's viewing device (the "viewport") may vary, or the enlargement/diminution (zoom) of the graphics within the viewport may vary, a hierarchy of overlapping bounding boxes is defined. Thus, if the viewport is large, the largest bounding box may be chosen from the hierarchy of bounding boxes defined for that moment in time to maximize the amount of graphical information on the screen and to position it within the viewport. Or some smaller bounding box from the hierarchy might be chosen and the graphics within that bounding box zoomed to fit the viewport. The bounding boxes within the hierarchy are generally categorized to enable the application program that controls the display of the graphics to choose, based on the application, which bounding box(es) controls the display.

Figure 3:
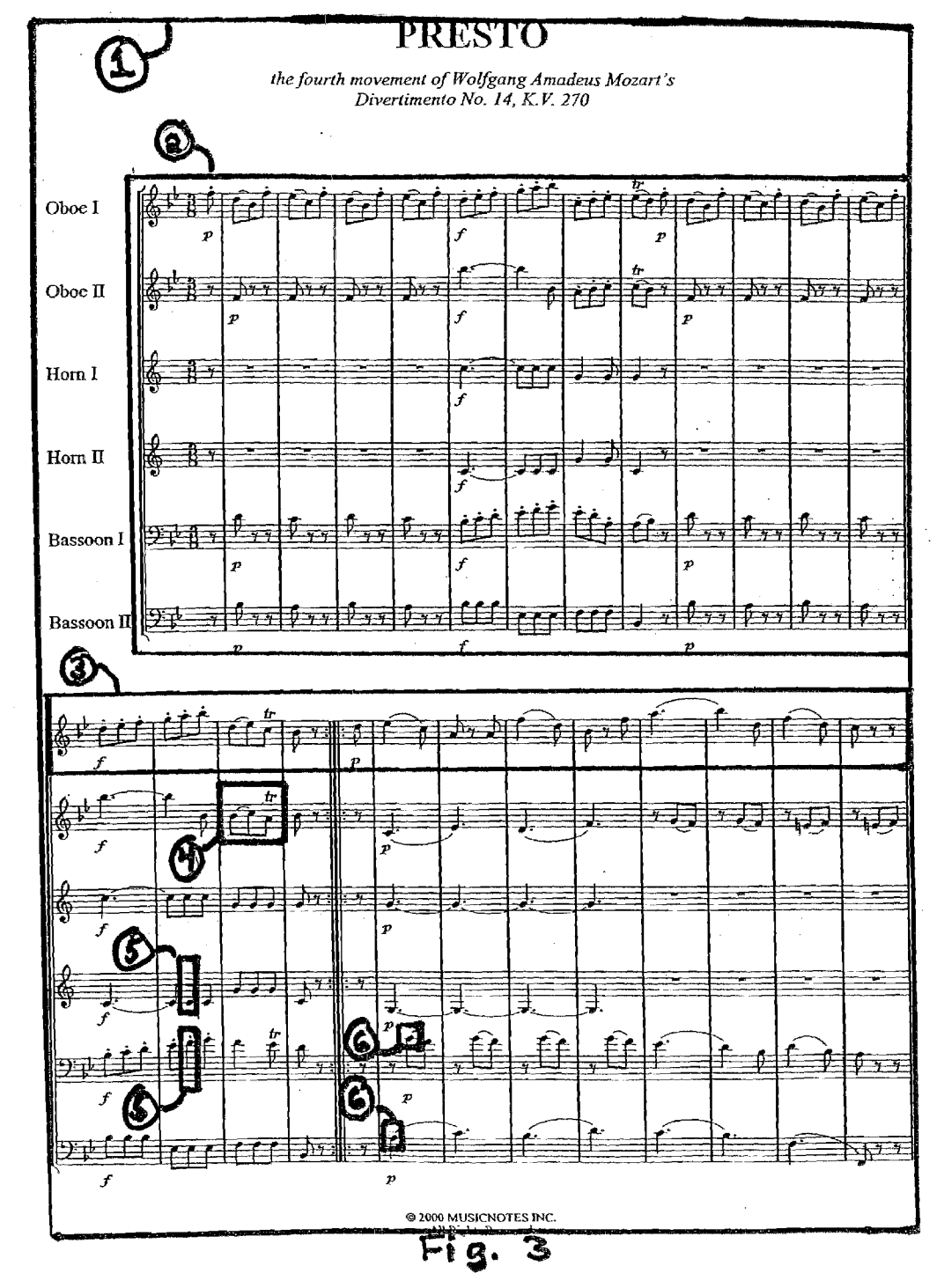

A good example of the usefulness of this hierarchy of bounding boxes, categorized by function, is the synchronization of a musical score to a musical performance. A six level hierarchy of bounding boxes might be defined for each page of the musical score, as illustrated in FIG. 3. Box 1 is a Level 1 bounding box for all graphics on the page, encompassing all the notational representation in one page. The next bounding box (denoted as 2) in the hierarchy is a Level 2 bounding box for each system of music on the page: a Level 2 bounding box encompasses from 1 staff to many staves (the displayed piece is for an orchestra). Bounding box denoted as 3 corresponds to a Level 3 bounding box for each staff of music within the system. The staff bounding boxes, in turn, include Level 4 bounding boxes for each measure of music within the staff (denoted as 4). Measure bounding boxes contain slice bounding boxes of Level 5, corresponding to bounding boxes for each chord within the measure. Finally, Level 6 bounding boxes 6 are provided for each note within the chord. Each kind of bounding box, except for the Level 1 page bounding box, is disposed within a higher hierarchy bounding box: for example, measure boxes are disposed within the staff boxes. Since the size of a higher hierarchy box (a staff box) is known, then the size of a lower hierarchy box (a measure box) is known not to exceed that size of the higher hierarchy box, therefore, making the hierarchical bounding box structure a good compression tool.

Every bounding box defined is thus labeled with its level or function:
Level 1: page
Level 2: system
Level 3: staff
Level 4: measure
Level 5: chord
Level 6: note An application, such as the Musicnote Player, uses this hierarchy of bounding boxes to algorithmically display the appropriate portion of the musical score, and/or to hi-light individual notes, as the audio plays. Parameters set by the application's user may affect which bounding boxes are used. For instance, a user might wish the music to be displayed as large as possible on his or her screen, but always to have a full measure visible. The top and bottom (north and south) of the system bounding box and the left and right (east and west) of the measure bounding box would be used to locate the appropriate graphics and then these graphics would be zoomed to fit the user's viewport. The application then displays the next measure in a similar way at the appropriate time: the musical score thus "follows" the performance.

Bounding boxes are ordered within the MTD file such that the reading application program determines the hierarchical relationships of all bounding boxes. That is, the application is programmed to know that a specific note bounding box belongs to a specific chord bounding box, which belongs to a specific measure bounding box, etc. The application program can easily structure the data to facilitate quickly traversing the hierarchy. For instance, if the user moves the mouse within a note bounding box, its measure bounding box can be immediately determined. This ability greatly facilitates user interaction with the graphics.

All bounding boxes are rectangular. This, plus exploiting the contiguity of any bounding boxes and using the ordering of bounding boxes described above, allows for massive compression of the bounding box data. To use a musical example, a single system of music for four single-staff instruments of eight measures each would have 37 bounding boxes of interest (for the purpose of simplifying this example, we will ignore the many more bounding boxes that define slices (chords) within the measures and notes within the slices):
one system bounding box
4 staff bounding boxes for the staves
32 measure bounding boxes If all 37 bounding boxes were described by two pairs of coordinates—for instance, lower left corner and upper right corner—with each coordinate as a two byte integer, without compression these thirty-seven bounding boxes would require 37 boxes×4 ordinates×2 bytes=296 bytes.

However, the top Y axis of the top staff is the same as the top of the system bounding box. The bottom Y axis for the bottom staff is the same as the bottom of the system bounding box. Similarly, the left and right edges of each staff are the same as the left and right edges of the system bounding box. Similarly, the left edge of any succeeding measure may be taken from the right edge of the preceding measure's bounding box. And so forth.

By exploiting these contiguities, by ordering the data carefully, and by expressing measurements in offsets from previous points (generally reducing two byte integer coordinates to 1 byte offsets), the number of bytes can be compressed:
a. Upper left coordinates of the system bounding box 4 bytes
b. Width of system bounding box 1–2 bytes
c. Height of system bounding box 1–2 bytes
d. Y axis for three staves, as offsets from top of system bounding box 6–12 bytes
e. Height of standard staff 1 byte f. Measure offsets (distance from left edge of measure) 5 bytes.
Total bytes to transmit full coordinates for all 37 boxes 17–25 bytes.

It is also noted that the above-described method of compression is well suited not only for fast electronic transmission of music files, but also for transmission of any kind of information capable of being logically subdivided into a hierarchy of bounding boxes organized by their location. Such hierarchy is also well suited for synchronization with any kind of time sequential events.

Any bounding box in the hierarchy may be "tagged" with additional information, which can be added or removed, depending on the needs of a user. For instance, level 6 bounding boxes in a musical score can be tagged with data that give the pitch and duration of the note contained within the bounding box. This feature is useful for user interactivity: clicking within a note bounding box could sound the proper pitch by using the bounding boxes tagged information.

Since the bounding box data are organized by location, and not by time, such data can also include asynchronous material. The above-described structure of the MTD files allows for definitions of non-hierarchical bounding boxes and the tagging of such bounding boxes. These are generally used to define hyperlinks. For instance, the bounding box around any occurrence of the word "staccato" in a musical score might be included in the defined bounding boxes and tagged with a unique number. The application program displaying and performing the musical piece senses when the user has clicked within the bounding box and in response initiates a Help explanation—keyed to the unique tag number—of the musical term "staccato". In another example, if an example figure appears at the bottom of a page, it may be included in the bounding box data as an additional system box. Its temporal position (or lack thereof) can then be established in a Sequence Map (described below). Since the bounding box data do not point directly to the page data, such a structure does not offer an entry wedge for potential decrypters, therefore, increasing security of the MTD files.

Data reduction of bounding box tagged information is also achieved through the use of various tables. If each bounding box in a level of bounding boxes (such as the note level, when representing a musical score) is to be tagged with multiple pieces of information (pitch, duration, note head shape, etc.), the multiple tags can be entered into a corresponding table once, and then multiple bounding boxes can point with a single value to that single table entry.

2. Sequence Map Section

The Sequence Map governs the sequence in time of bounding boxes presented in the bounding box data. The sequence Map contains one or more "tracks", each track being a unique path or thread through the bounding box data. For instance, in a string quartet, a track might be defined for each instrument. To make the Viola part appear animated as the music plays. Each bounding box in the Viola track would be hi-lighted in time. Generally, the Sequence Map contains tracks for every instrument in a score; playing all tracks simultaneously will hi-light the entire score in time. The Sequence Map also may contain a lyrics track: hi-lighting the lyrics track in time will cause the words of the song to be animate karaoke style.

Any track within the Sequence Map may reference bounding boxes at any level within the bounding box hierarchy. Thus, if the application programmer were only interested in hi-lighting whole systems of music as the music played, tracks would be defined at Level 3, the systems level. Generally, a track defines a sequence of bounding boxes at Level 4, the measure level. A schema for a Sequence Map is illustrated in FIG. 4. The header defines the number of tracks in the sequence. Each track, such as track 1 shown in FIG. 4, is defined by its own header specifying the subsequence level and the number of sub-sequences. Each subsequence is defined by its starting number and the number of successive bounding boxes in that subsequence. Track 2 and subsequent tracks in the Sequence Map are defined in a manner similar to that of track 1.

An example of data corresponding to the schema of FIG. 4 is provided in FIG. 5. The data of FIG. 5 represent a Sequence Map for a 124 measure string quartet movement, with the first eight measures being repeated in the score. As can be seen in FIG. 5, the particular Sequence Map comprises 4 tracks. Track 1 comprises Level 4 bounding boxes (measures) and 2 subsequences. Track 1 starts at measure 1 and uses 8 measures of bounding boxes. Then track 1 starts at measure 1 again and then uses 124 measures of bounding boxes. Track 2 is defined in a similar way, illustrated in FIG. 5. Tracks 3 and 4 are similar to tracks 1 and 2. As can be seen from FIG. 5, the total number of bytes required to represent the data in FIG. 5 is 25 (6 bytes for each of the 4 tracks, plus 1 byte for the header). Therefore, great data compression is achieved by reference to the hierarchical structure of the bounding box data.

3. Time Map.

The Time Map (or Time Maps) is a series of values that represent articulations in time. These articulations correspond to time-ordered events in a pre-existing movie or audio recording, or they may prescribe the timing of events in a movie or audio performance that is to be generated programmatically. An MTD file may have any number of time maps to represent differing movies or audio performances.

The time map begins with a map for the full performance, followed by maps for each additional track in the sequence map. If there is no sequence map, or if the sequence map does not begin with the full performance, then the time map defaults to an implicit performance made of all the bars and slices (chords) in the bounding box data, taken in order. The reason that the tracks and their times appear as two separate maps is to make it easier to make corrections to the time map without rewriting or disturbing other data.

For a musical work, the Time Map gives the times for every staff and slice (chord) in the full performance. The Time Map comprises a header and a series of numbers representing times for each slice. For data compression, these times are given as the time differentials (deltas) between a particular slice and the preceding slice in the track. The full performance time map gives the times for every bar and slice in the full performance. The count for such times may be less than all the bars and slices in the bounding box data, if the sequence map has an explicit or an abridged full performance track.

For greater compression of data and speed in processing, each time in the Time Map has an associated value that contains a single bit for each track defined in the Sequence Data section. As the application maps bounding boxes to times in the Time Map, it will skip any time value whose bit is set off for that track. Thus, a track in a Sequence Map may include a measure that contains one or more slices not played by that track: if the bit is not set, that slice is ignored when that track's sequence is played.

The time maps for additional tracks, if there are any, are generally similar to the full performance time track. Each such time map comprises a time map header and one or more series of numbers. Each series is described by the series type, series count and delta times. The series count characterizes how many slices and bars from the track are mapped to time by this series. The sums of all the series counts in a track time map is equal to the total count of all slices and bars in the corresponding track. The series type describes the manner in which the delta times are associated with bars and slices. For example, depending on the type of the time map, an individual delta time may appear for each bar and slice, or all the bars and the slices may have already been read into the full performance map, so there will be no delta times in the series, or only the times between the bars, but not slices, may be given.

If a Time Map is derived from an existing movie or recording, an MTD file will include a section containing information concerning that recording, such as the track number of the music, the total duration of the track, etc. The sequencing of bounding boxes and the construction of the corresponding time maps allow synchronization of different kinds of events and actions during the playback. For example, sudden changes in volume levels, or a gradual increase in volume over time, is linked to the time map. Textual information may similarly be synchronized to various events during the playback through the abstraction of the bounding boxes, time sequences and maps. For instance, the lyrics of a song can be keyed to the time map, allowing syllables to be displayed in time to the music.

An example of a schema for a Time Map is provided in FIG. 6. The Time Map starts with a header. The header comprises information about the audio/visual source of the music and real-time performance, such as the track number on a CD or total duration of a recording. The header also specifies the number of events in the Map, such as the number of slices in a musical score and the like). The Time Map also comprises time events (events 1, 2, and 3 in FIG. 6), defined by the time offsets and track flags. The time offsets specify the number of time units between the current events and the previous event. A track flag specifies the number of bits for each track in a Sequence Map.

FIG. 7 provides the sample data for a Time Map of a musical score according to the schema of FIG. 6. The first byte provides an index into the table of audio sources. The next variable number of bytes represents the total number of slices in the score (4985 slices in FIG. 7). The next variable number of bytes represents the offset of slice 1 from the start of the recording (0 time units in FIG. 7). The next variable number of bytes represents that tracks 1, 2, and 3 are active (line 4 in FIG. 7). A binary 7 in that line corresponds to 0000111, which has bit one set to 1, bit 2 set to 1 and bit 3 set to one, meaning that tracks 1, 2, and 3 are active and have slice bounding boxes. The next line in FIG. 7 is a variable byte corresponding to the offset of slice 2 from slice 1 (in time units), which is 25 time units. The next line is a variable number of bytes defining the tracks that set for slice 2. Binary 6 is 0000110, meaning that tracks 2 and 3 are active and have slice bounding boxes. The next line corresponds to the variable number of bytes specifying the offset of slice 3 from slice 2 (in time units), which is 13. The last line in FIG. 7 is a variable number of bytes specifying that only track 2 has music at this slice (binary 2 is 0000010, meaning that only track 2 is set as active). It is noted that all the values are compressed by using a single byte for all values under 128; values over 128 use a bit flag (bit 7) to indicate that the following byte is part of the value.

FIG. 8 illustrates a method of providing a compact data file by using the three data subsets to display a sequence of visual events at pre-defined times. More specifically, as described above, a track defined in the Sequence Map is used to sequence visual events defined in the bounding box data and synch those visual events to an external performance by displaying them at the times specified in the Time Map. The method is described as follows: a particular track is chosen to be synchronized (10) and the sequence level (20) and total number of sub-sequences (30) are read from the track's header data in the Sequence Map. A pointer is set to the first event in the Time Map (40). A looping procedure is then started to step through all the sub-sequences in the track and all the bounding boxes in each sub-sequence ((50) through (120)). First, a starting number of a sub-sequence of bounding boxes is read along with the total number of bounding boxes in that sub-sequence (50). The starting number and the track sequence level are used to locate and set another pointer to the actual bounding box in the bounding box data (60). The current event in the Time Map is then examined (70) to see if the bit corresponding to that track is set. If not, the pointer is moved to the next time event (80). Step (80) is repeated until a time event with a set bit is found. The corresponding bounding box may now be hi-lighted (or stored in a table as described below) at the time specified in the Time Map (90). If this is not the last bounding box in the sub-sequence (100), then the bounding box pointer is moved to the next box (110) and the time pointer is moved to the next time event (80), and the process continues. If the end of the sub-sequence is reached (120), a news sub-sequence is read (50) or—if there are no more sub-sequences—the track is ended.

Generally, because of timing considerations, the above method is first performed in non-real time; that is, instead of actually hi-lighting the bounding boxes in time, a table is constructed consisting of any bounding boxes to be hi-lighted at each specific time event. This allows several or all of the tracks to be prepared for simultaneous hi-lighting. Then the audio or video recording is started and simultaneously the table is stepped through, hi-lighting at the appropriate times.

Although specific embodiments have been described and illustrated herein, it will be appreciated by those skilled in the art that any arrangement, which is calculated to achieve the same purpose may be substituted for the specific embodiments shown. Therefore, this application is intended to cover any adaptations or variations of the present invention. Therefore, it is manifestly intended that this invention only be limited by the following claims.

What is claimed is:

1. A computer implemented method for providing compact representation of data, the method comprising:

logically separating the data into graphical data and multimedia data; and providing at least three sequencing schemes within the multimedia data by:

providing a first sequencing scheme comprising a hierarchical structure of bounding boxes serving to synchronize displayed graphical data with a series of time ordered events;

providing a second sequencing scheme comprising a sequence map containing one or more tracks, each track being a path through the hierarchical structure of bounding boxes; and providing a third sequencing scheme comprising at least one time map defining the series of time ordered events wherein the hierarchical structure of bounding boxes is defined for a musical score.

2. The method of claim 1, wherein the graphical data are a musical notation, and wherein the series of time ordered events correspond to a musical performance.

3. The method of claim 1, wherein providing the third sequencing scheme comprises providing a plurality of time maps corresponding to a plurality of musical performances.

4. The method of claim 1, wherein providing the three sequencing schemes is done server-side before transmitting the data to a user.

5. The method of claim 1, further comprising providing a single bit for each track defined in the sequence map, each single bit for each track indicating whether a bounding box is associated with a time event.

* * * * *